United States Patent
Stone et al.

(10) Patent No.: US 7,034,960 B2
(45) Date of Patent: Apr. 25, 2006

(54) SYSTEM AND METHOD FOR MANAGING ELECTRONIC TRANSMISSION OF COLOR DATA

(75) Inventors: Gordon Robert Stone, Cirencester (GB); James Christopher Putney, Charlotte, NC (US); Danny C. Rich, Hamilton Square, NJ (US); Stephen Roderick Postle, Glen Rock, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 763 days.

(21) Appl. No.: 09/931,678

(22) Filed: Aug. 16, 2001

(65) Prior Publication Data

US 2003/0035126 A1   Feb. 20, 2003

(51) Int. Cl.
*G06F 15/00* (2006.01)
*G06F 3/12* (2006.01)
*G06K 15/00* (2006.01)
*G06K 9/00* (2006.01)

(52) U.S. Cl. .................. 358/1.9; 358/2.1; 358/1.15; 382/167; 382/162

(58) Field of Classification Search ............... 358/1.1, 358/1.6, 1.9, 2.1, 1.15; 356/402, 425; 345/593, 345/748; 399/54; 709/217; 707/6; 493/320; 382/167, 162
See application file for complete search history.

(56) References Cited

U.S. PATENT DOCUMENTS

| | | | | |
|---|---|---|---|---|
| 4,649,502 | A | 3/1987 | Keller et al. | 364/519 |
| 4,813,000 | A | 3/1989 | Wyman et al. | 364/526 |
| 4,843,574 | A | 6/1989 | Gerber | 364/526 |
| 5,141,323 | A | 8/1992 | Kipphan et al. | 356/406 |
| 5,182,721 | A | 1/1993 | Kipphan et al. | 364/526 |
| 5,195,043 | A | 3/1993 | Varner | 364/410 |
| 5,400,138 | A | 3/1995 | Peterson et al. | 356/319 |
| 5,406,475 | A | 4/1995 | Kouchi et al. | 364/401 |
| 5,450,314 | A | 9/1995 | Kagami et al. | 364/148 |
| 5,555,505 | A | 9/1996 | Oosawa et al. | 364/470.07 |
| 5,668,633 | A | 9/1997 | Cheetam et al. | 356/402 |
| 5,680,327 | A | 10/1997 | Cook et al. | 364/526 |
| 5,720,017 | A | 2/1998 | Cheetam et al. | 395/131 |
| 5,774,230 | A | 6/1998 | Goto | 358/298 |

(Continued)

FOREIGN PATENT DOCUMENTS

DE   3707027   9/1988

(Continued)

OTHER PUBLICATIONS

Crim, Elias, Controlling Digital Color, American Printer, Nov. 1997, pp. 26,28, and 30.

(Continued)

*Primary Examiner*—Mark Wallerson
*Assistant Examiner*—Charlotte M. Baker
(74) *Attorney, Agent, or Firm*—Sidney Persley, Esq.

(57) ABSTRACT

A system which enables electronic communication, coordination and dissemination of color-related designs, specifications and products. Color production and maintenance in a simultaneous fashion is provided between a plurality of disparate parties in substantially "real time." The present integrated color-production is capable of importing electronic output from many diverse instruments, including color production-related hardware and software, and further uses the output to automatically deliver product data to and from a plurality of geographically disbursed parties. The present invention also provides an electronic library comprising colors and textures to be used for accurately matching a color sample and/or specification. The integrated, on-line color-related production system of the present invention enables parties to operate at peak efficiency, producing high sales and customer satisfaction.

82 Claims, 9 Drawing Sheets

U.S. PATENT DOCUMENTS

| | | | | |
|---|---|---|---|---|
| 5,841,421 | A | 11/1998 | Cheetam et al. | 345/150 |
| 5,877,966 | A | 3/1999 | Morris et al. | 364/512 |
| 6,015,809 | A | 1/2000 | Zhu et al. | 514/210 |
| 6,040,902 | A | 3/2000 | Jung et al. | 356/73 |
| 6,043,894 | A | 3/2000 | Van Aken et al. | 356/425 |
| 6,108,095 | A | 8/2000 | Graf | 356/425 |
| 6,192,147 | B1 | 2/2001 | Bucher et al. | 382/165 |
| 6,233,496 | B1 | 5/2001 | Ippitsu | 700/133 |
| 6,342,952 | B1 * | 1/2002 | Chan | 358/1.9 |

FOREIGN PATENT DOCUMENTS

| | | |
|---|---|---|
| DE | 3714179 | 11/1988 |
| DE | 4229267 | 3/1994 |
| DE | 4237004 | 5/1994 |
| DE | 19637234 | 3/1998 |
| EP | 0 825 506 A2 | 2/1998 |
| GB | 2071473 | 9/1981 |
| GB | 2107047 | 4/1983 |
| GB | 2289018 | 11/1995 |

OTHER PUBLICATIONS

Stoy, John W., Palette Control Made Easy, Electronic Publishing, May 1997, pp. 46-47.

Lovig-Neale, Deb, Digitial Color Fidelity in the 1990s: Attacking Color Shifts, Electronic Publishing, Aug. 1994, pp. 14-16, and 18.

Matching System Ensures Accuracy, Printing Impressions, Oct. 1990, pp. 36H-36K.

Bonham, J.S., Flowers, A.G., Johnson, L.B., On-Line Color Control for Mechanical Papers, Pulp & Paper Canada, Apr. 1990, pp. 43-46.

Kaverman, John, Color Matching for Pad Printing, Screen Print, Dec. 1999m pp. 38-40, 42,44, and 46.

Brigss, John C., Forrest, David J., Tse, Ming-kai, Reliability Issues for Color Measurement in Quality Control Applications, NIP 14:International Conference on Digital Printing Technologies, Toronto, CA, Oct. 1998, pp. 595-602.

Prolink Color Guard Color-Matching Software, Screen Printing, Nov. 1995, pp. 132.

1995 TAPPI Conference—Dyes, Fillers & Pigments Short Course, Chicago, IL, Apr. 26-28, 1995, pp. 401-418.

Sule, A D, Recent Developments in Colour Measurement and Colour Management, Indian Journal of Fibre & Textile Research, vol. 21, Mar. 1996, pp. 64-68.

Holland, Caryl, Color Impact & Control, American Ink Maker, Sep. 2000, pp. 14-17.

Rosen, Mitchell, Fairchild, Mark D., Johnson, Garrett M., Wyble, David R., Color Management Within a Spectral Image Visualization Tool, Munsell Color Science Laboratory, Rochester Institute of Technology Rochester, NY.

Mijdam, Edward, Computer-Controlled Color Matching of Flexographic Inks in a Production Printing Environment, American Ink Maker, Aug. 2001, pp. 44-49.

Tolliber-Nigro, Heidi, The Packaging Workflow: What's Really Going on in There?, American Ink Maker, Jun. 2001, pp. 30, 32, 36, 37, 59, and 60.

Taskar, Milind; Kannan, R., Colour Maker—An Infinite Shade Card and the Colour Trend Setter of Shades in the Industry, Pigment and Resin Technology, vol. 27, pp. 9-11.

Datacolor Press Release, Lawrenceville, NJ, Jul. 11, PRNewsire.

* cited by examiner

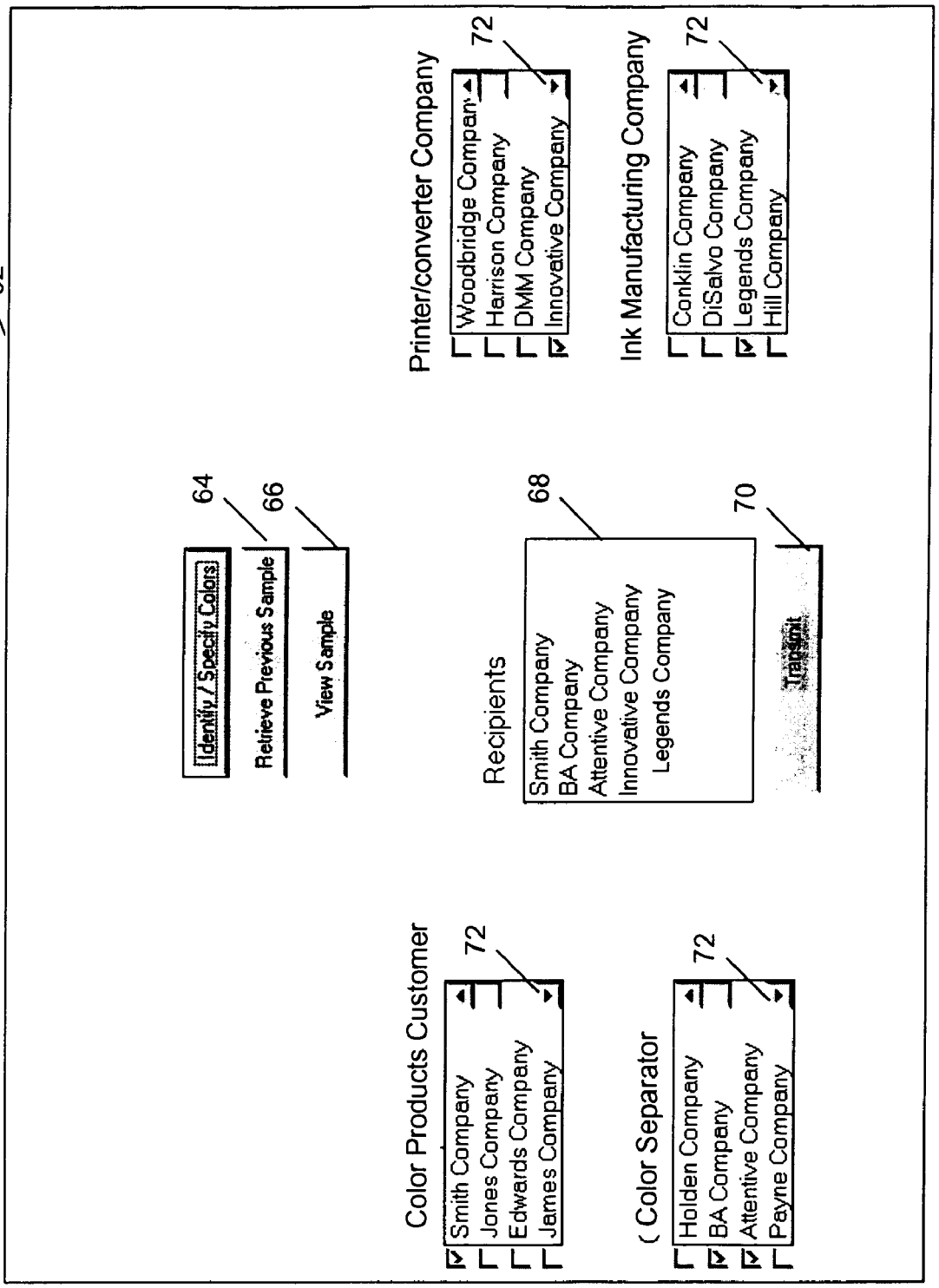

FIG. 9
Search Screen

Spectrocolorimeter

Specular state Excl. / Incl.

UV state Excl. / Incl.

CIE Standard Observer 1931 / 1961

Iluminant  1

These fields could be replaced with references to a color selection guide or CIELAB coordinates for searching  2

3

Color Tolerance Equation and Parameters

Ink range

Printing process (offset/flexo etc.)

Substrate

After processing (varnished/laminated etc.)

Customer

Advanced search (see next page)

Calibrate

Measure

SYSTEM AND METHOD FOR MANAGING ELECTRONIC TRANSMISSION OF COLOR DATA

FIELD OF THE INVENTION

The present invention relates to a system and method for electronically communicating, coordinating and disseminating product designs, specifications and production-related data between a plurality of parties. More particularly, the invention relates to the coordination of parties that create color and graphic designs, including manufacturers, designers, suppliers and printers for new or existing products.

BACKGROUND OF THE INVENTION

The development of color-related products frequently involves a coordinated effort of assorted color product development specialists, such as manufacturers, designers, printers, ink manufacturers, dye manufacturers, paint manufacturers and material suppliers. Demand for products and services provided by these businesses originates from many industries, including cosmetics, plastics, textiles and the food industry. A great deal of communication between the contributors to a color product can be expensive and time burdensome. Frequently, the communication frequently comprises physically handling and delivery of samples for approval during the several developmental stages in the production chain.

During creation of color products, many samples are packaged and delivered to many different parties for approval. For example, a designer provides physical design samples to a manufacturing company for approval, a plate separator converts digital and/or analog images into a form of printing plates or cylinders and submits proofs to a designer or manufacturer, a formulator submits proofs to a printer, and a printer submits samples to a designer and/or manufacturer for approval. Physical models of the design and prospective future appearances are included in the package.

In the event that any one sample is unacceptable, for example, because it varies from the original specifications, then a party relying on the sample usually insists upon revisions. Whenever revisions to a sample are made, new samples typically are provided for additional review.

For example, a printer may require products and services from material suppliers, including ink manufacturers, dyers, separators and the like. Potentially expensive packages containing samples, prototypes and documents relating to each party's respective involvement are transferred between the parties. Physical packages typically require approval in a particular sequence during development in the production chain. Reliance upon a particular schedule increases the impact of delays caused by a lengthy sample creation and acceptance process. Moreover, samples that are rejected after several stages of development have already been approved can result in changes that impact those previously approved stages.

Electronic color production hardware and software systems currently exist which separately and independently perform many of the tasks required in the above-described production chain. For example, a known system reads a visible spectrum of a color sample and generates data directed to measured amounts of light absorbed or reflected at particular points in the spectrum. Any given color has a spectral curve associated with it that functions as a signature of the color. Once a spectral curve is determined, the visible spectrum and coefficients are then processed to predict a color formula for reproducing the color. This measuring technique is more accurate than, for example, the calorimetric approach to color representation because the colors will appear the same in any lighting environment.

The calorimetric representation is a numeric method (CIELAB) of representing a color, wherein "L" represents the lightness to darkness of a color, "A" represents the redness to greenness of a color and "B" represents the yellowness to blueness of a color. The values of similarity between colors is determined by calculating the sum of the squares of the differences between the L, A and B values. This method is not as comprehensive as determining spectral curves for a color because the values are applicable for only one lighting condition. Differing lighting conditions can produce different shades of color, and thus a new set of CIELAB values.

Other common color representations exist, for example RGB represents the degree of red, green and blue in a color. CMYK represents the degree of cyan, magenta, yellow and black in a given color. Accurate translation between color representations, for example a translation from RGB to CMYK for computer monitors and computer printers is provided. Accurate color reproduction is achieved, in part, by retrieving data for a plurality of input and output devices, e.g., printers, monitors, and color measuring devices, and modifying the color translation formulas to account for the specific devices receiving the data.

Another known system provides a method and apparatus for accurately matching colors. For example, spectral data are received from a color measuring device and the corresponding color is matched in an electronic color library. The desired color is compared to colors stored in the electronic color library and the color or colors in the library that are within a specified color range are reported. By searching in an electronic library, the traditional standard color swatch book used for locating a desired color is replaced. This electronic color library is vulnerable, however, to problems associated with reproducing samples from multiple devices.

Another method involves receiving a communication of the designer's computer image and converting the RGB setting to CIELAB values. Computer software design packages such as ADOBE PHOTOSHOP and ADOBE PAGEMAKER provide such conversion functionality.

The assemblage of mutually distinct and often disparate methods, samples, and goods as encountered in the current prior art can potentially result in errors and delays in the process. Each communication delay frustrates the color reproduction process and can result in the associated parties trying to identify a party to be held liable.

SUMMARY OF THE INVENTION

The foregoing illustrates the need for a system that enables electronic communication, coordination and dissemination of color-related designs, specifications and products between the parties identified above. The present system enables color-related design and development in a simultaneous fashion between a plurality of disparate parties in substantially "real time." The data are formatted, evaluated, and further transmitted to a plurality of parties, thus providing improved efficiency of color selection, approval and production.

Currently, no system is available which integrates the management of disparate methods of color product development into a seamless automated system. The present integrated color-production system is capable of receiving electronic data regarding color products from diverse color production-related hardware and software. The present invention is further capable of translating the data into a plurality of recognizable formats (e.g., RGB, CIELAB, CMYK and visual spectral data) and further enables accurate reproductions of color to be generated. Moreover, the present invention manages the delivery of data to a plurality of geographically dispersed parties.

In the present invention, accurate electronic images supplement numeric data transmissions in order to give non-technical participants confidence in the coloration process. The present invention also provides an electronic library comprising colors and textures to be used for accurately matching a color sample and/or specification. The electronic library enables parties to transmit accurate proofs regarding a color specification. The integrated system of the present invention further notifies parties when revisions to samples are required.

Moreover, the present system evaluates data regarding color product design and development, and, based upon the evaluation, directs control of color product development. For example, a designer using the present invention may be notified that a particular design will cause excessive costs or time delays.

The present invention is flexible in that parties are provided with data that are particular to their involvement with the product. For example, a packaging designer may need to transmit specifications regarding design, color and source of ink to a printer. Concurrently, a packaging designer specifies design and color to a color products customer, e.g., PROCTOR AND GAMBLE, or FRITO-LAY. A printer requests inks from an ink supplier, and the ink supplier orders materials from a materials supplier. The integrated, on-line color-related production system of the present invention enables parties (e.g., manufacturers, cosmetics manufacturers, textile manufacturers, designers, separators, printers, ink manufacturers, etc.) to transmit data corresponding to their respective involvement, and further to operate at peak efficiency thus producing high sales and customer satisfaction.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which:

FIG. 8 shows an example of a display screen through which a user navigates to transmit color product-related data; and FIG. 9 depicts an example of a display screen for searching in a color library for a color match.

DETAILED DESCRIPTION OF THE INVENTION

As used herein, the term "web site" refers to a related set of files which are maintained in one or more "web server(s)" and which, when transmitted to a user terminal, cause the user terminal to display and/or execute programmatic operations corresponding to the data contained in the files. Typically, the files comprising the web site are prepared using one or more of a combination of Hyptertext Mark-Up Language (HTML), Extendable Mark-Up Language (XML), Java Applets, ActiveX programs, Standard Generalized Mark-Up Language (SGML) files and the like. Web site files are typically transmitted to the user terminal using one or more protocol(s) such as the Hypertext Transfer Protocol (HTTP) under the Transmission Control Protocol/Internet Protocol (TCP/IP) suite of communication protocols.

Also as used herein, the term "browser" refers to an application program residing and executing on the user terminal which functions as an HTTP client, sending requests to web servers for web site files. The request is typically sent in the form of a Uniform Resource Locator (URL) or by selecting a hypertext link presented on the user terminal display. The browser functions to receive a file and/or data from the web server and format the received files and/or data in the manner described therein, displaying the same on the user terminal. Examples of browser programs include MICROSOFT INTERNET EXPLORER and NETSCAPE COMMUNICATOR.

Also as used herein, the term "visibly perceptible representation" refers to a perception of color as received by the human eye or other detecting device regardless of the medium for providing the representation, i.e., computer monitor, paper, printing press, etc.

As used herein, the term "link" refers to a selectable connection from one or more word(s), picture(s) or other information object(s) to others in which the selectable connection is presented within the web browser. The information object can include sound and/or motion video. Selection is typically made by "clicking" on the link using an input device such as a mouse, track ball and the like. Of course, one of ordinary skill in the art will appreciate that any method by which an object presented on the screen can be selected is sufficient.

Figure 1:
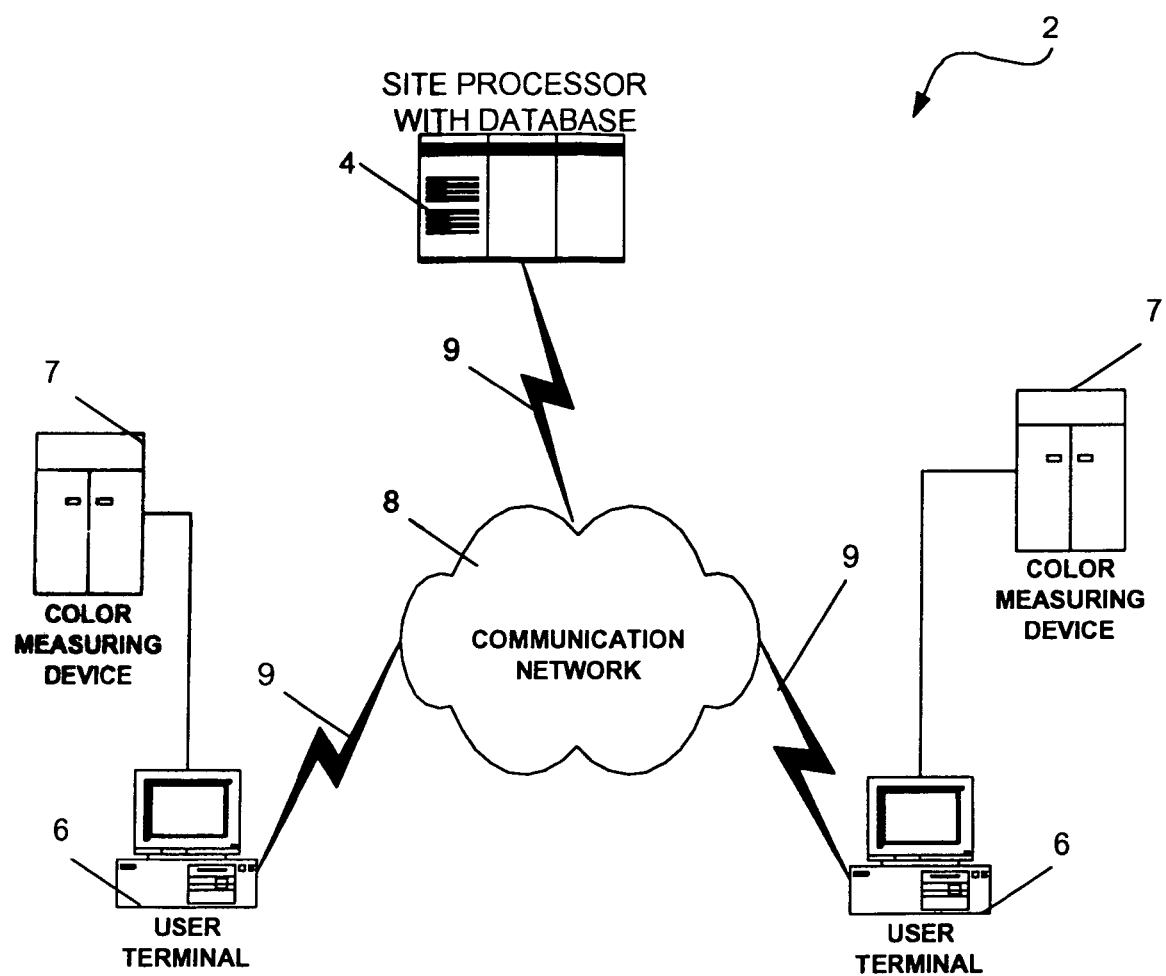
FIG. 1 is a diagram of an example hardware arrangement for a color management system constructed in accordance with the principles of the present invention.

Referring now to the drawings figures in which like reference numerals refer to like elements, there is shown in FIG. 1 a diagram of an example color management system constructed in accordance with the principles of the present invention and designated generally as "Color Management System 2." Color Management System 2 is preferably comprised of one or more site processor(s) 4 coupled to one or more user terminal(s) 6 across communication network 8.

Site processor 4 preferably includes all databases necessary to support the present invention. However, it is contemplated that site processor 4 can access any required databases via communication network 8 or any other communication network to which site processor 4 may be coupled. If separate, site processor 4 can communicate with the database using any known communication method including a direct serial or parallel interface, or via a local or wide area network.

User terminals 6 communicate with site processors 4 using data connections 9, which are respectively coupled to communication network 8. Communication network 8 can be any communication network, but is typically the Internet or some other global computer network. Data connections 9 can be any known arrangement for accessing communication network 8 such as dial-up serial line interface protocol/point-to-point protocol (SLIP/PPP), integrated services digital network (ISDN), dedicated leased-line service, broadband (cable) access, frame relay, digital subscriber line (DSL), asynchronous transfer mode (ATM) or other access techniques.

User terminals 6 have the ability to send and receive data across communication network 8, and are equipped with web browsers to display the received data on display devices incorporated therewith. By way of example, user terminals 6 may be personal computers such as Intel Pentium-class computers or Apple Macintosh computers, but are not limited to such computers. Other terminals which can communicate over a global computer network such as palmtop computers, personal digital assistants (PDAs) and mass-marketed Internet access devices such as WebTV can be used. User terminals 6, further, take into account associated hardware, for example printers, monitors, scanners and the like.

Also as used herein and for purposes of convenience, the term "workstation" refers to a user terminal 6, and, as appropriate in context, further refers to a person operating user terminal 6.

Also as used herein, the terms "workstation characteristics" and "user terminal characteristics" refer to the functional elements of each workstation, including, but not limited to, central processing units, ROM, RAM, display devices, printing devices, network interfaces, disk drives, floppy disk drives, tape drives, CD-ROM or DVD drives, databases and application code and one or more input device(s), for example keyboard, mouse, track ball and the like.

In addition, the hardware arrangement of the present invention is not limited to devices that are physically wired to communication network 8. It is contemplated that wireless devices using a wireless application protocol (WAP) can inter-operate with site processors 4 using wireless data communication connections.

According to the present invention, user terminal 6 provides user access to site processors 4 for the purpose of receiving and providing color-related product data. The specific functionality provided by Color Management System 2, and in particular site processors 4, is described in detail below.

Color Management System 2 employs software that provides color production and maintenance functionality. The software preferably resides on one or more site processor(s) 4. One of the functions performed by site processor 4 is that of operating as a web server and a web site host. Site processors 4 typically communicate with communication network 8 across a permanent i.e., unswitched, data connection. Permanent connectivity ensures that access to site processors 4 is always available.

Figure 2:
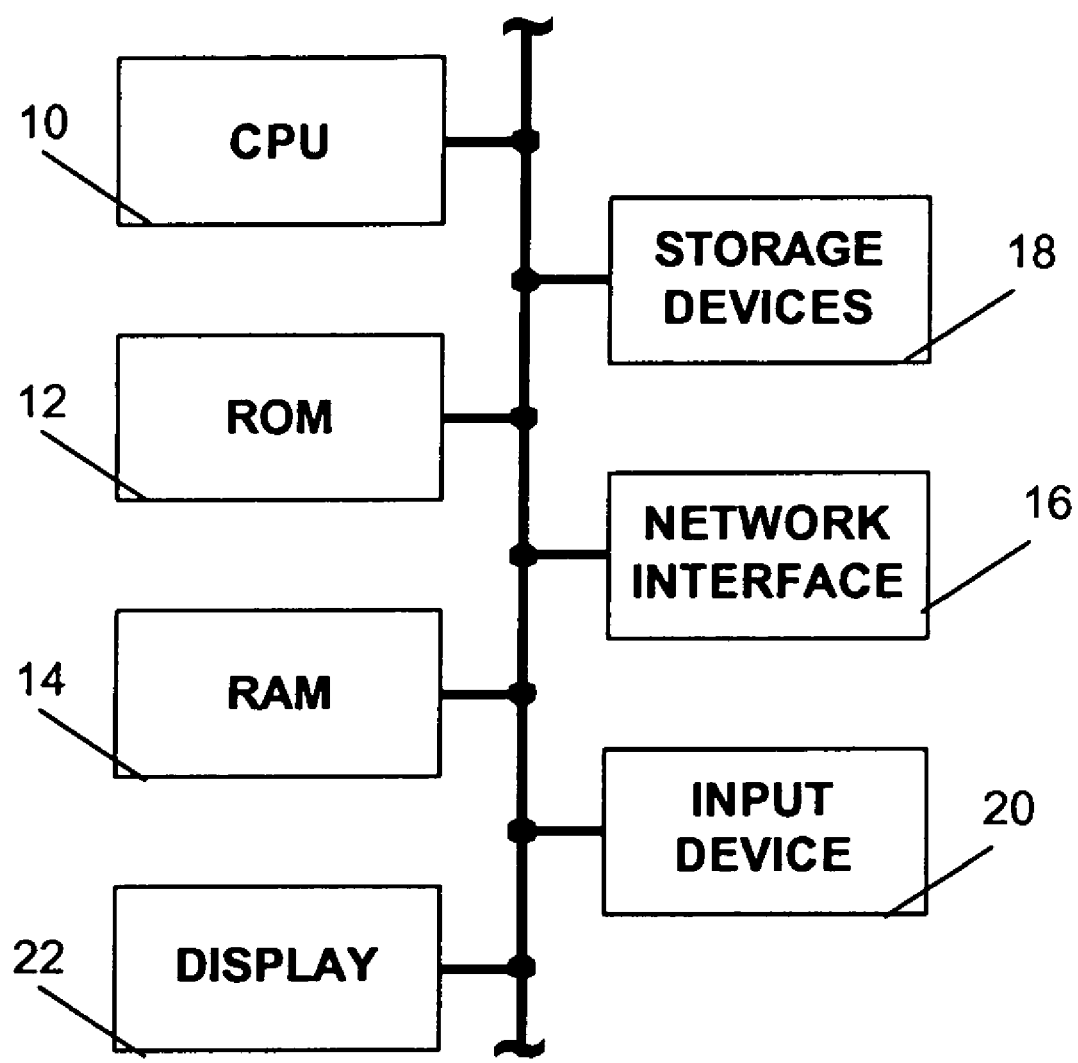
FIG. 2 is a block diagram of the functional elements of site processors and user terminals.

As shown in FIG. 2 the functional elements of each site processor 4 preferably include one or more central processing unit(s) (CPU) 10 used to execute software code in order to control the operation of site processor 4, read only memory (ROM) 12, random access memory (RAM) 14, one or more network interface(s) 16 to transmit and receive data to and from other computing devices across a communication network, storage devices 18 such as a hard disk drive, floppy disk drive, tape drive, CD-ROM or DVD drive for storing program code, databases and application code, one or more input device(s) 20 such as a keyboard, mouse, track ball and the like, and a display 22.

The various components of site processor 4 need not be physically contained within the same chassis or even located in a single location. For example, as explained above with respect to databases which can reside on storage device 18, storage device 18 may be located at a site which is remote from the remaining elements of site processors 4, and may even be connected to CPU 10 across communication network 8 via network interface 18.

The functional elements shown in FIG. 2 (designated by reference numbers 12–22) are preferably the same categories of functional elements preferably present in user terminal 6. However, not all elements need be present, for example, storage devices in the case of PDAs. Further, the capacities of the various elements are arranged to accommodate the expected user demand. For example, CPU 10 in user terminal 6 may be of a smaller capacity than CPU 10 as present in site processor 4. Similarly, it is likely that site processor 4 will include storage devices 18 of a much higher capacity than storage devices 18 present in user terminal 6. Of course, one of ordinary skill in the art will understand that the capacities of the functional elements can be adjusted as needed.

The nature of the present invention is such that one skilled in the art of writing computer executed code (software) can implement the described functions using one or more of a combination of a popular computer programming language including but not limited to "C++", Visual Basic, Java, ActiveX, XML, HTML, and other web application development environments, for example ALLAIRE'S COLD FUSION® and MICROSOFT'S FRONT PAGE®.

As used herein, references to displaying data on user terminal 6 relate to the process of communicating data to the user terminal across communication network 8 and processing the data such that the data can be viewed on the terminal's display 22 using a web browser or the like. The display screens on terminals 6 present areas within Color Management System 2 such that a user can proceed from area to area within Color Management System 2 by selecting a desired link. Therefore, each user's experience with Color Management System 2 will be based on the order with which they progress through the display screens. In other words, because the system is not completely hierarchical in its arrangement of display screens, users can proceed from area to area without the need to "backtrack" through a series of display screens. For that reason, unless stated otherwise, the following discussion is not intended to represent any sequential operation steps, but rather the discussion of the components of Color Management System 2.

Although the present invention is described by way of example herein in terms of a web-based system using web browsers and a web site server (site processor 4), Color Management System 2 is not limited to that particular configuration. It is contemplated that Color Management System 2 can be arranged such that user terminal 6 can communicate with, and further send, receive and display data to and from site processor 4 using any known communication and display method, for example, using a non-Internet viewer coupled with a local area network protocol such as the Internetwork Packet Exchange (IPX). Any suitable operating system can be used on user terminal 6, for example, WINDOWS 3.x, WINDOWS 95, WINDOWS 98, WINDOWS CE, WINDOWS NT, LINUX and any suitable PDA or PALM computer operating system.

In a preferred embodiment, Color Management System 2 provides a comprehensive, yet easy to use, web site that enables users to transmit or receive data relating to development of one or more color product(s). Color product specialists, including customers, designers, separators, printers, converters and the like preferably interact with each other, and with Color Management System 2 itself, via one or more hardware and/or software user interface(s). The user interfaces comprise display screen controls such as text input areas, drop down lists, buttons and screen menus providing users with tools for adding, viewing, and editing data.

Color product development specialists preferably transmit data regarding hardware devices to Color Management System 2. For example, the makes and models of monitors, printers, scanners and other color measuring devices that are employed during the development of a color product are transmitted to Color Management System 2. Color Management System 2 preferably stores the device-related data for future reference in one or more database(s) (see FIG. 3).

In a preferred embodiment, user terminal 6 receives data from a color measuring device 7, for example, a spectrocolorimeter. A data stream is transmitted which may be initially formatted in a variety of device-related ("native") configurations. For example, sequences of data values originating from some measuring devices 7 correspond to an interval in which spectral reflectance curves are read. One particular color measuring device 7 may have a spectral reflectance curve data reading interval of 20 nm which produces a data sequence comprising patterns of 16 numbers. A different color measuring device 7 may have an interval of 10 nm resulting in data formatted in sequences of 31 numbers. The data are preferably received, formatted to a common standard, and processed notwithstanding their device-dependent qualities.

Continuing with the above example, user terminal 6 validates the received data, translates the data into distinct representations, performs data calculations (e.g., averaging and interpolating color data), and further transmits data to other hardware and software applications in a plurality of formats. Data are preferably transmitted directly to the receiving devices. Alternatively, the formatted data are transmitted to site processor 4 and thereafter forwarded to the respective receiving hardware and software applications.

In another embodiment, user terminal 6 interfaces with a color measuring device 7 and receives spectral data, but does not perform any data processing functions. User terminal 6 transmits the spectral data to site processor 4 at substantially the same time when the data are being received from the measuring device 7. Programmed data formatting routines operate within site processor 4 and the data are further transmitted to hardware and software applications.

In yet another embodiment, a color measuring device 7 is not used during development of a color product. Instead, a color sample is created or retrieved on a user terminal 6 with software provided by system. For example, a designer operating user terminal 6 creates a sample of color. The sample is transmitted to Color Management System 2 and development of the color product continues. In this embodiment, no color measuring device 7, other than the user terminal 6, is utilized by the respective parties.

Color Management System 2 promotes accuracy and uniformity by translating data regarding color that are received from color product specialists into visual spectral data. As noted above, visual spectral data accurately represent a color and are processed to predict a color formula to reproduce a color. Data received, for example, from a designer may require adjustment given subtle discrepancies in color readings between disparate color product development hardware devices. Furthermore, Color Management System 2 uses the device-related data to translate data representing a color from one format (e.g., RGB, CMYK, CIE XYZ) into visual spectral data. The color data can thereafter be translated into another device-dependent format for reception by other color product specialists.

For example, a designer submits a physical sample of color which is scanned by a scanning device, i.e., color measuring device 7. The specifications and software drivers for the particular color measuring device 7 are preferably stored in Color Management System 2 (see database table 34 in FIG. 3). Color Management System 2 references the stored device-related data and adjusts the data received from the color measuring device 7 to accurately represent the desired color.

Figure 3:
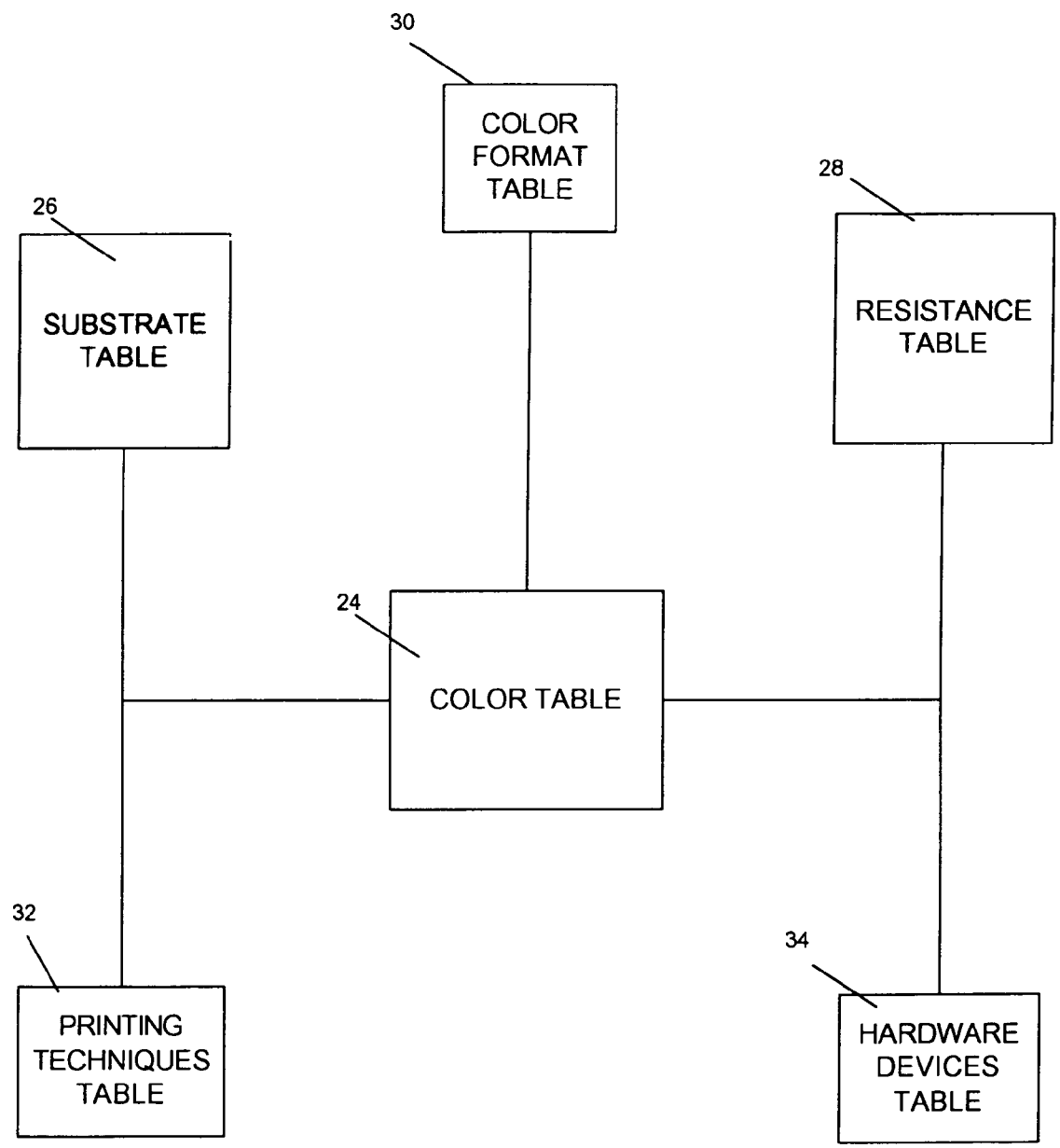
FIG. 3 illustrates the relationships between database tables used in an embodiment of the present invention.

FIG. 3 illustrates the interaction of database tables in a preferred embodiment of the present invention. The tables are used by Color Management System 2 to store and manipulate data regarding development of color and color products. Users of Color Management System 2 are preferably given access to the database tables and to the data therein. In a preferred embodiment, users are supplied with a pointer to the specific database table and/or data therein rather than receiving the complete database tables or data at the user terminal 6.

As show in FIG. 3, color table 24 preferably contains records regarding the creation a color. For example, spectral data regarding a specific color are stored in color table 24. Substrate table 26 stores data regarding specific substrates and the relative impact of substrates on color. Resistance table 28 contains data regarding a color's ability to resist a plurality of elements, for example water, solvent, acid, alkali, temperature, humidity, abrasion, crocking, bending, light and ultraviolet radiation. Color format table 30 preferably contains data regarding the plurality of color representations (e.g., RGB, CMYK and CIE XYZ) used by the various devices in Color Management System 2.

Continuing now with FIG. 3, printing technique table 32 contains data regarding a plurality of printing methods, for example offset printing and gravure printing. As noted above, different printing methods impact costs and processes during development of a color product. Color Management System 2 preferably references hardware table 34 to evaluate the costs and processes associated with a identified printing method. Hardware devices table 34 contains data regarding a plurality of hardware devices involved in color product development, for example monitors, printers and scanners.

In a preferred embodiment, each of the records in database tables 26–34 are related to a color record in color table 24. For example, a record exists in color table 24 corresponding to a particular shade of blue. The substrate table 26 contains the types of substrates on which that blue color cannot be used. Furthermore, printing techniques table contains the types of printing methods for which that color blue cannot be used. The resistance table 26 contains associated records that relate to the ability of that blue color to resist the kinds of elements discussed above with regard to resistance table 26. By relating records in a plurality of tables to one or more records in the color table 24, Color Management System 2 can evaluate color product design and development functions provided by users during development of a color product.

Color Management System 2 preferably uses database tables, for example the tables identified in FIG. 3, to evaluate the compatibility of color product development processes, and further to direct color product development processes.

Color Management System 2 further provides interfaces which serve to control devices, for example to calibrate a color measuring device to a color standard, during color product development without significant user intervention. Color Management System 2 preferably references the stored device-related data to assist in automating the color product development process.

Furthermore, Color Management System 2 provides for accurate color representation and reproduction on the respective color product development devices. For example, Color Management System 2 compares a color sample received by one color product development specialist with output received from a first printer, preferably by measuring the spectral curves of the color sample and the first printer's output. Color Management System 2 then determines whether any discrepancy exists between the original sample and the color that was thereafter output by the printer. Color Management System 2 preferably adjusts the color representation values (e.g. CIELAB) in order for the first printer to generate a more accurate color reproduction. Thereafter, a second printer preferably provides color output, and Color Management System 2 repeats the process and adjusts and transmits, for example, CIELAB values to the second printer. Color Management System 2 electronically adjusts color representations (e.g., RGB, CIELAB, CIE XYZ, and CMYK) for all of the respective input/output devices, thereby ensuring accurate color representation and reproduction.

As noted above, Color Management System 2 references device-related data in tables 24–34 to evaluate the compatibility of the processes involved in development of a color product. It may be impossible, for example, to use a particular color on a specific substrate using a specific printing method because the substrate cannot support the quantity of ink required to produce the color. Color Management System 2 preferably evaluates processes involved before and during development of a color product, and, based on its evaluations, takes appropriate action. In a preferred embodiment, Color Management System 2 prevents a designer from continuing in the color product design process upon discovering incompatible developmental processes. For example, if a designer chooses the combination of the particular color, specific substrate and specific printing method described above, Color Management System 2 alerts the designer of the incompatibilities of the choices. In this example, the designer is required to change one or more element(s) of her design before Color Management System 2 will allow her to proceed. In an alternative example, Color Management System 2 provides corresponding warnings to the designer via the user interfaces, but does not halt the color product design process.

Figure 4:
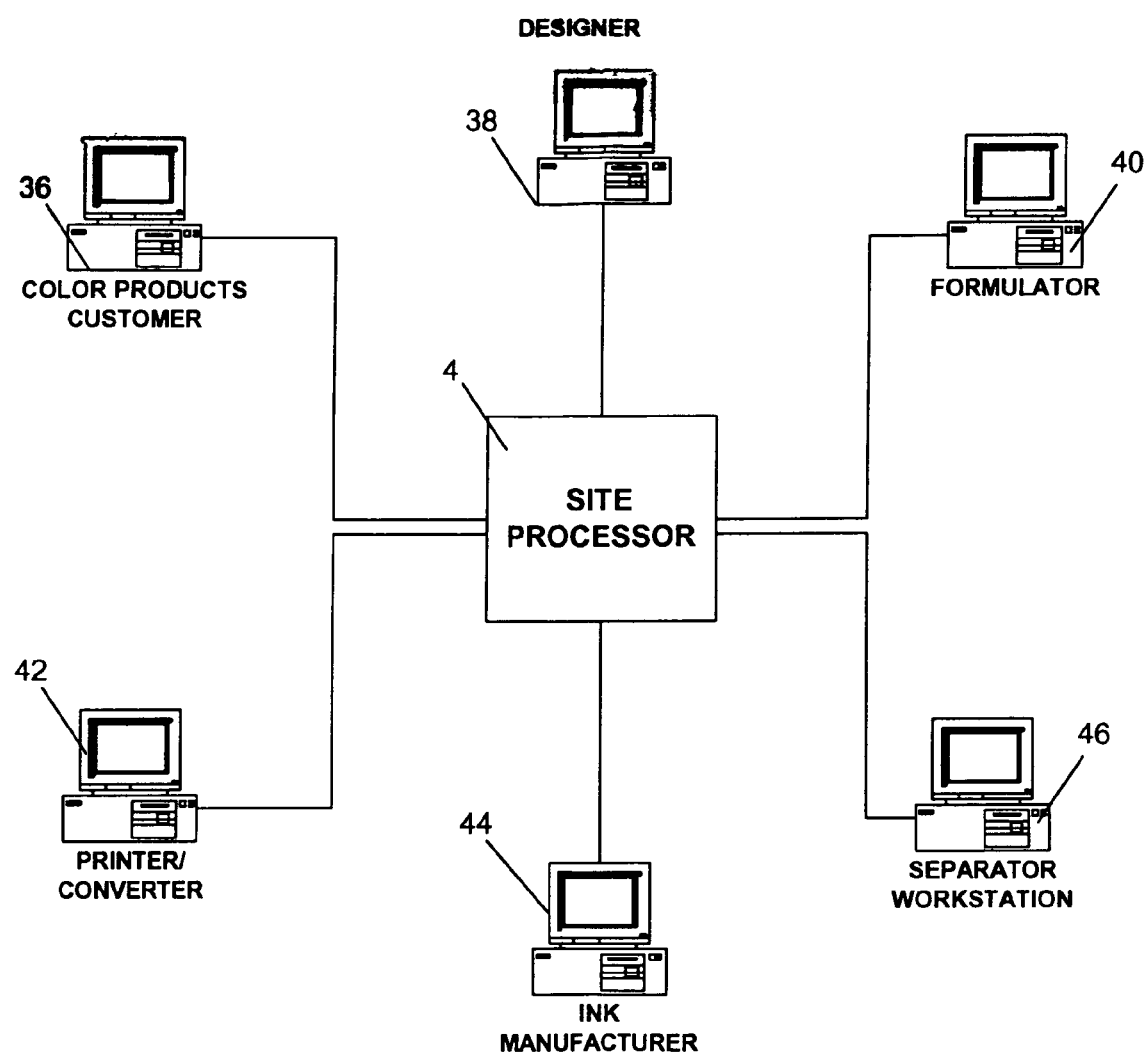
FIG. 4 depicts the relationships between the pertinent parties.

A detailed description of the parties to Color Management System 2 and their respective functions is now discussed with reference to FIG. 4.

In accordance with the principles of the present invention, Color Management System 2 preferably receives color product data from a plurality of sources, including color measuring devices and user terminals 6. As noted above, Color Management System 2 preferably evaluates development processes associated with a design of a color product to ensure compatibility among the processes.

During color product development, Color Management System 2 preferably continues its control over the development process, for example by halting production, or by notifying the color product specialists of potential problems, discrepancies and/or limitations with a product design or production method. For example, a color products customer 36 hires a designer 38 to design a brochure. After designer 38 identifies a particular substrate for the brochure, e.g., paper, Color Management System 2 identifies specific printing or engraving techniques that are effective or otherwise problematic, less or more expensive, etc. Furthermore, Color Management System 2 identifies particular specialists capable of providing the required development services for a color product. Preferably, Color Management System 2 evaluates and controls the development process, for example by suggesting methods, restricting development choices and the like, until development of the color product is complete.

During development of a color product, a color standard is preferably received by Color Management System 2 and a search is performed in an electronic color library for a desired color match. The color library is preferably stored on site processor 4 and the desired color data, for example, spectral data, are compared with a set of previously stored color data in the library. Color Management System 2 preferably selects at least one color that best matches the desired color. The search results are preferably formatted in a plurality of ways, for example, specific PANTONE® numbers, CIE XYZ values, CMYK values, and a plurality of color bases.

In addition to matching a color, Color Management System 2 provides a retrieval mechanism for color searches based upon criteria including restrictive filters. For example, by including filter criteria and queries to match color samples, color criteria can be combined with other qualities, e.g., substrates, bases, resistance to water, acids, solvents and the like. Some bases, for example, are not suitable with strong solvents or detergents that may be used for outdoor or food use.

When acceptable matches are retrieved and, if necessary, adjusted for accuracy, data are transmitted to parties, for example, color products customers 36 (FIG. 4) and/or designers 38 for approval or ordering. The data that are received by approving parties preferably comprise color comparisons and differences, for example, CIELAB, CMC and CIE94 as opposed to spectral data. These terms represent color differences or color tolerances in the CIELAB to approximate uniform color space. In an alternative embodiment however, spectral data are formatted in a standardized way and transmitted to the respective parties for approval and/or ordering.

Other data are preferably transmitted with the color approval data, for example sales and formula codes, color formulas, costs or price information, various illuminants and metamerisms. Data are preferably provided to the user in a plurality of languages, e.g., English, French, Spanish, German and Italian to account for international recognition of the data. Furthermore, a sample of several color matches including visible image files and spectral data are preferably provided for comparison and approval. Data entry forms are also preferably available for users of Color Management System 2 to enter and edit data. For example, a user can enter and/or edit color, resistance, and cost or price data using data entry forms.

As Color Management System 2 maintains proprietary data for its users, access to Color Management System 2 is preferably restricted by means by a plurality of methods, for example by registering users and restricting their access with appropriate user names and passwords.

The parties to Color Management System 2 typically comprise a plurality of color product development specialists. Some combination thereof, for example a color products customer 36 and a designer 38, may be employed by one entity. Due to the many possible combinations of businesses and users of Color Management System 2, FIG. 4 depicts the parties in terms of a plurality of workstations employed by these parties.

As noted above, a plurality of parties interface with Color Management System 2 during the creation of a color product. Color products customers 36, either independently or with designers 38, provide color product specifications or color product samples to a separator 46. The separator 46 generates at least one proof for the color products customer 36 and/or designer 38 who either approve or reject the proof(s). The separator 46 further provides proofs and color data to a printer 42 who produces the final color product. Printers 42 typically contract with ink manufacturers 44, who may further work with formulators 40 and raw materials suppliers during the printing process.

The demand for color products and services originates from many types of businesses and non-business parties that have needs for color production. For example, consumer product manufacturing, advertising, promotional material, and interior and exterior design companies require color-related services. Color products customers 36 specify color requirements for packaging products, for example food packaging. Color products customers 36 further provide details including package design parameters, colors, substrates and print processes to one or more parties. Color Management System 2 allows the associated color product development specialists to communicate substantially simultaneously.

For example, a designer 38 receives transmitted specifications from one or more color products customer(s) 36 and thereafter a designer 38 creates a product design. Designer 38 distributes color-product design specifications including, for example, associated substrates and inks to, for example, color products customer 36 and separator 46.

Color products customers 36 frequently contract with separators 46 for creation of film or digital proofs of the product for review and approval. A color match is first electronically "proofed" by printing the inks onto the associated substrates using laboratory-scale equipment before being taken to a production line. However, the laboratory-scale batch of proofs may not always match the color of the commercial production run.

In plastics manufacturing, for example, the production size batch may not develop the exact same color as the laboratory-scale batch. To overcome this problem, users provide details regarding the end product in the electronic color library and the present invention provides a coordination of methods to adjust the laboratory-scale batch to a production-scale batch before the production batch is processed.

The proof is thereafter electronically transmitted to a party for approval. Once the proof is approved, a formulator 40 determines a color formula, for example, by referencing color table 24 to identify pigments associated with the specified color in order to match the measured characteristics thereof.

The separator 46 further provides formatted color data to printer/converter 42. Separator 46 preferably presents color proofs to color products customers 36 for approval, and further transmits printing related information to printers/converters 42 for production.

Many other communications between the contributing parties to the development of a color product occur. For example, printers/converters 42 contract with ink manufacturers 44 for production of ink. Formulators 40 calculate appropriate color formulas that define appropriate color weights and combinations of pigment for creation of a specific color, for example by referencing data in color table 24. Ink manufacturers 44 further communicate with raw material suppliers, dyers, separators, plate makers, cylindrical engravers and the like, for materials according to specific parameters. As noted above, the prior art method of communicating this information is costly and timeconsuming.

According to the principles of the present invention, Color Management System 2 evaluates the respective parties' contributions to development of a color product prior to, and during, the development of the color product. Color Management System 2 preferably evaluates, for example, the desired color of the product, the desired substrate that the color will be used on and the desired printing method for the product. By evaluating the color product prior to and during the respective parties' involvement with the development of the product, the time and capital costs are greatly reduced.

For example, a designer 38 desires to place a specific color (e.g., navy blue) on a specific substrate (e.g., newspaper) using a specific printing process (e.g., gravure printing). After evaluating the desired color, substrate and printing technique, Color Management System 2 notifies the designer 38 that the chosen substrate (e.g., newspaper) is unable to support the desired color and printing technique. Color Management System 2 accordingly prompts the designer 38 to change some of her design. The designer 38 decides to change the substrate to a thick, corrugated cardboard, and Color Management System 2 evaluates the modified design. In this example, Color Management System 2 prevented the associated parties to development of the desired color product from investing time, materials and capital by determining the combined color, substrate and printing technique were incompatible.

Other embodiments of the present invention are available with regard to the way a user interfaces with Color Management System 2. For example, once the designer 38 selects the desired color (e.g., navy blue), Color Management System 2 presents available substrates that can support the color. Moreover, after the designer 38 selects a substrate, Color Management System 2 presents available printing techniques that can produce the desired color product. In an alternative embodiment, Color Management System 2 provides many choices to the designer 38 at the outset of color product design, and as the designer 38 makes selections (e.g., navy blue on a particular substrate), the number of available design choices is reduced accordingly.

The availability of design function choices presented by Color Management System 2 correspond with the color product characteristics selected by the operator of Color Management System 2. While the above examples illustrate the availability of color product design options for a designer 38, the system is not so limited. During each stage of development of a color product, e.g., cylinder engraving, separating, ink manufacturing, printing, etc., options are preferably made available by Color Management System 2 which correspond with selections made by the respective parties. By preventing the selection of choices which are incompatible with a color product, Color Management System 2 prevents valuable resources such as time, money and materials from being wasted and further provides for increased efficiency during the development of a color product.

In addition to preventing resources from being wasted during the color product development process, Color Management System 2 preferably enables contributing parties to a color product to transmit to each other electronic samples for approval. For example, Color Management System 2 preferably generates visibly perceptible representations of the desired color. After a respective party submits additional details regarding the color product, such as a desired substrate, Color Management System 2 generates a visibly perceptible representation based upon the desired color and desired substrate. Color Management System 2 preferably uses the data received by the contributing parties to generate visibly perceptible representations of materials used during the creation of the color product, such as a specific ink, and further to generate images of the color product itself.

Other material supply specifications include details such as color, Theological properties, product resistance, and residual chemical requirements. Completed ink samples are transmitted to a printer/converter 42 and are further delivered to several parties, including color products customer 36, designer 38 and/or formulator 40 for approval.

During the process of ink creation, the printer/converter 42 may electronically order revisions based on the samples he receives. Alternatively, the printer/converter 42 performs modifications, for example, by electronically determining and changing the strength and shade of an ink in order to meet a color standard under the conditions of a final press run. The printer/converter 42 transmits an electronic color sample from a press run to a color products customer 36 or designer 38 for review.

Figure 5:
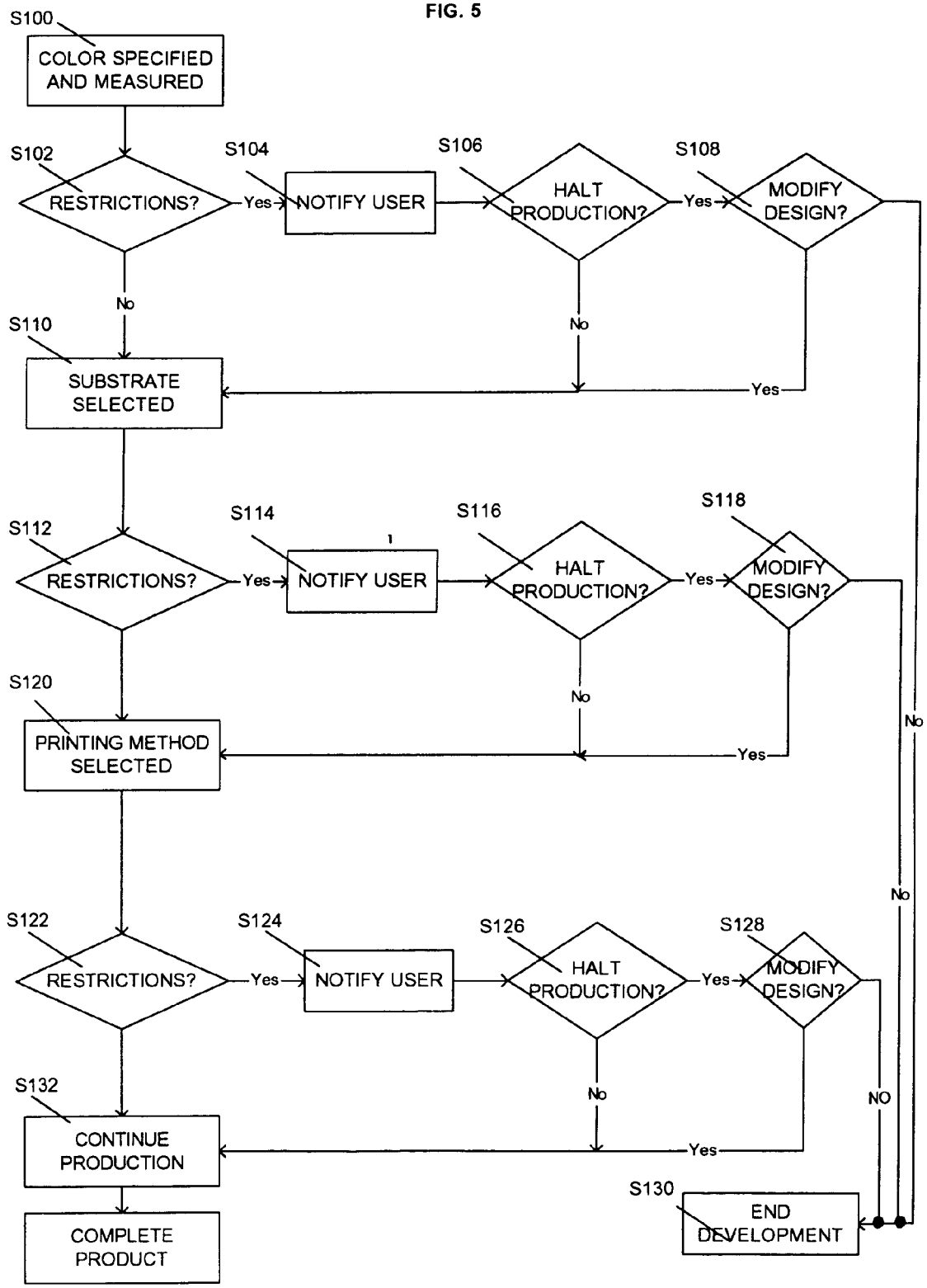
FIG. 5 shows a flow chart identifying a control of the processes involved in the development of a color product.
Figure 6:
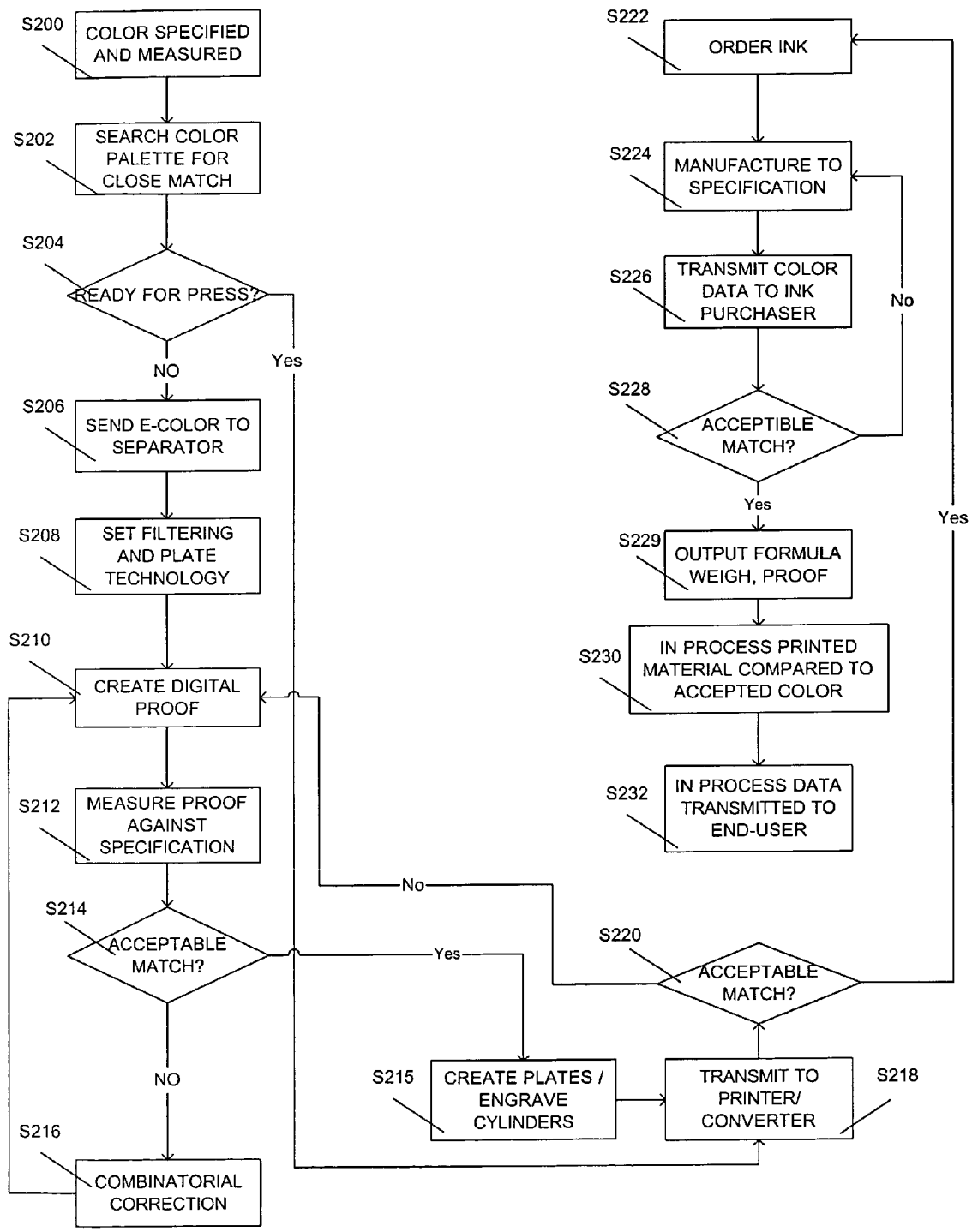
FIG. 6 depicts a flow chart identifying the development of a color product.

An example of the color management process including the interaction between the modules is now described with reference to the flow charts as shown in FIG. 5 and FIG. 6, with reference to the parties depicted in FIG. 4. This example represents one possible sequence of events in the production chain that depends, in part, upon the desired, finished product. The following example refers to a cereal manufacturer 36 that requires a new cereal box to be produced. The cereal manufacturer 36 contracts with a designer 38 for a new design of the new cereal box.

As shown in FIG. 5, designer 38 designs a new cereal box. The colors of the box are electronically specified in Color Management System 2 (step S100). Thereafter, Color Management System 2 evaluates the colors and determines whether restrictions exist for the given color (step S102). For example, the specified color may not be available in a high gloss finish.

If Color Management System 2 determines that restrictions exist, such as the available finish, then Color Management System 2 preferably notifies the designer 38 of the restrictions (step S104). Color Management System 2 preferably determines whether the designer can proceed with the current design options or if the choices selected by the designer 38 are such that the product cannot be developed (step S106). If Color Management System 2 determines that the product cannot be developed given the selections the designer 38 made, the production is halted until the designer 38 modifies the design (step S108). In the event the designer 38 elects not to modify the design, then development ends (step S130).

Continuing with the flowchart shown in FIG. 5, after Color Management System 2 determines that the designer 38 is not required to modify the existing design, or in the alternative the designer 38 modifies the existing design, then the process continues to step S110 wherein the designer 38 identifies the desired substrate the color will be placed on. Color Management System 2 thereafter determines whether the specified substrate is compatible with the selected color (step S112). In the particular embodiment described in this example, the designer 38 is making design choices. Color Management System 2, though, is such that any or all of the parties contributing to the development of a color product (e.g., color products customer 36, formulator 40, printer 42, etc.) can make and enter product design and development choices into Color Management System 2.

If Color Management System 2 determines that the current substrate selection and color selection are incompatible, then the user is appropriately notified (step S114). Color Management System 2 preferably determines whether the designer can proceed with the current design options or if the choices selected by the designer 38 are such that the product cannot be developed (step S116). If Color Management System 2 determines that the product cannot be developed given the selections the designer 38 made, the production is halted until the designer 38 modifies the design (step S118). If the designer 38 elects not to modify the design, development of the color product ends (step S130).

After Color Management System 2 determines that the designer 38 is not required to modify the existing color and/or substrate selections, or in the alternative the designer 38 modifies the existing design, then the process continues to step S120 wherein the designer 38 identifies the desired printing method for the color product. Color Management System 2 thereafter determines whether the specified printing method is compatible with the selected color and selected substrate (step S122).

If Color Management System 2 determines that the current color, substrate and printing method selections are incompatible, then the user is appropriately notified (step S124). Thereafter, Color Management System 2 determines whether the choices selected by the designer 38 are such that the product cannot be developed (step S126). If Color Management System 2 determines that the product cannot be developed given the selections the designer 38 made, the production is halted until the designer 38 modifies the design (step S128). If the designer 38 elects not to modify the design, development of the color product ends (step S130). Otherwise, development of the color product continues (step S132). After the contributing parties to development of a color product approve samples during the development process, the color product is complete and delivered (step S134).

FIG. 6 shows a flowchart associated with the physical development of color products which runs concurrently with the flowchart described in FIG. 5. At the outset, designer 38 designs a new cereal box. The colors of the box are electronically specified and measured (step S200). User terminal 6 (FIG. 1) preferably generates or receives a data stream containing spectral data. In step S202, the spectral data are formatted and entered into an electronic color palette application. The colors for use on the new box are selected from a palette of real, obtainable colors. A search is performed for close color or spectral matches. When a color match is returned for review, the designer 38 and/or the cereal manufacturing 36 determines whether the match is acceptable for a final press run (step S204). If the match is of an acceptable quality, then spectral data and viewable electronic images are transmitted to a printer/converter 42 for review and/or production (step S218).

If the match from the electronic color palette is not satisfactory to the designer 38 and/or cereal manufacturer 36, then the designer 38 electronically transmits spectral data, properly formatted if necessary, to a separator 46 for filtering and proofing (step S206). The separator 46 sets filtering and plate technology to produce a final color (step S208). Corrections may be made for converting processes that may be required, such as to account for lamination (step S208). When the separator 46 achieves a desired match, the printing plates are made and/or cylinders are engraved for sample proofs (step S210).

The proof is thereafter measured and compared to the original electronic sample received from the designer 38 (step S212). At step S214, a determination is made whether the proof is of an acceptable match. Preferably, the designer 38 or cereal manufacturer 36 makes this determination. If there is not an acceptable match, further combinatorial corrections are made (step S216) and the process returns to step S210 for a repeat of the proofing process.

If the designer 38 or the cereal manufacturer 36 decides that the proof submitted by the separator 46 is acceptable, visible electronic image files and spectral data corresponding to the proof are transmitted to multiple parties for review and continued development in the production chain (step S218). For example, an image file, e.g., a TIFF file, is transmitted to the cereal manufacturer 36, and color difference data, e.g., CIELAB data, are transmitted to the printer/converter 42. The printer/converter 42 evaluates the sample (step S220). If the sample is rejected, then the printer/converter 42 directs the separator 46 to output another sample proof (step S210). If the sample proof is accepted, then corresponding cylinders are engraved and plates are made (step S215), and the printer/converter 42, via Color Management System 2, orders ink (step S222).

The ink is thereafter created according to specifications furnished by the printer/converter 42 and the samples received from the separator 46 (step S224). Following the creation of the ink, an electronic sample of the ink, including spectral data and a visible electronic image file, are sent to the printer/converter 42 for approval (step S226). The purpose of the image file is to illustrate the differences between a large area, an isolated ink proof, and the same color ink printed in a complex image surrounded by other colors. When the printer/converter 42 has received the electronic image file and corresponding spectral data, the printer/converter determines whether the samples are accurately matched (step S228). If the sample is not approved, the process returns to step S236 for appropriate revisions to the information regarding the ink.

Once the ink sample is approved, then the formula is output from a formulator 40, a sample is generated from the formula, and further weighed and proofed (step S229). Additionally, in-progress printed materials may be delivered for comparison and review (step S230). For example, materials are delivered in step S242 for visual inspection and approval. Further, data are transmitted to the cereal manufacturer 36 which shows respective progress in the production chain (step S232). As materials are provided, additional approval may be required of the designer 38, cereal manufacturer 36 or both.

Nearly all of the foregoing steps describing Color Management System 2 involve the use of electronic transmissions. The cereal manufacturing 36 transmits product specifications and receives data-updates as the product is developed. The designer 38 and printer/converter 42 transmit specifications and receive data from the separator 46 and ink manufacturer 44 during the process.

Color Management System 2 preferably accepts output from a plurality of instruments and software types without significant user intervention. Color Management System 2 compensates for differences in hardware and software making the operation transparent to the user. Further, users can electronically order materials, e.g., ink based on electronic palette searches and/or accepted combinatorial color matches.

Color Management System 2 preferably provides printers/converters 42 with electronic specimens containing information regarding a conversion process, such as lamination, back printing, printing over foil, printing over coatings and the like. Color Management System 2 provides for more than creation of a correct color, the correction/maintenance of color can be performed substantially in "real time" and results in feedback that can be instantaneously transmitted to appropriate parties.

Additional functionality provided by Color Management System 2 is now described by way of an additional example.

A designer 38 creates a computer-aided design (CAD) drawing of office space and selects standard color furnishings and carpeting. The desired color of paint is selected by designer 38 from electronic displays for matching or contrasting furnishings. Color can be selected from an electronic palette of available paint colors and added to the CAD drawing. The designer 38 may opt to create a new color by manually making adjustments in Color Management System 2.

After submitting the desired color to Color Management System 2, the designer 38 is notified by Color Management System 2 that certain restrictions apply to the color the designer 38 selected. For example, the color may be available from only one known supplier, or the color may not be available in a high gloss finish. The notification process can comprise many forms; those skilled in the art will recognize that notification methods can assume many forms, for example by disabling functions, sending visual or audio messages to the display screen or speakers, respectively, etc. The designer 38 may be required to modify her design as more details regarding the desired color product are provided to Color Management System 2.

Continuing with the foregoing example, The desired color is electronically transmitted to a formulator. The formulator generates a color formula and transmits the formula to a paint supplier. By using Color Management System 2 via user terminal 6, the pigment dispensing devices operated by the paint supplier use the formulas received by the formulator to dispense appropriate pigment. The paint supplier thereafter produces a sample of the paint.

After a paint sample has been produced and calorimetrically measured, the local paint supplier sends an image file, e.g., a TIFF file, to the printer/converter, for visual confirmation of the desired color. It is preferred that the image file contains references to the spectral data rather then device dependent RGB settings. Further, spectral data of the paint sample are also transmitted for electronic comparison of the sample. Other parties, including color products customer 36, can receive image files and/or spectral data regarding color samples from local paint suppliers. The printer/converter 42 and/or color products customer 36 may direct the local paint supplier to make appropriate adjustments to the color sample until an acceptable match is provided.

Additional functionality provided by Color Management System 2 is now further described by way of yet an additional example.

A designer 38 creates a CAD drawing of a garment and selects standard colors. The desired color of the cloth is selected by the designer 38 by using display screens in Color Management System 2 to match or contrast the previous season's trend colors.

Color can be selected from an electronic palette of available cloth colors and added to the CAD drawing. The designer 38 may opt to create a new color by making manual adjustment in Color Management System 2. Formatted spectral data are transmitted electronically to a local garment supplier. Using Color Management System 2, the garment supplier provides an image file for visual confirmation of the desired color. Additionally, numeric spectral data are transmitted to a textile dyer.

If the desired color is retrieved from the electronic palette, the formula is immediately retrieved from the database and a sample dye is produced. If a new color is to be created, the closest palette color is retrieved and a correction to the formula is performed by color-correcting software and a test dye is produced. The dyer reads spectral data of the test dye's color to verify that it matches the desired color, and further electronically communicates a visible electronic image file and spectral data to the garment maker and designer. The designer 38 approves the match or may request adjustments.

Essentially the same operational phases take place in Color Management System 2 whether the need is for a building interior, a garment, a retail consumer product or a piece of graphic art. There is an inter-change of production or pre-production prototypes between the manufacturers, formulators, designers and printers that are electronically transmitted for approval and acceptance.

The present invention goes beyond merely substituting spectral data for physical samples. Physical samples are characterized and stored in an electronic library to which all parties have access. A common basis for comparison and communication is provided without the need for the physical proofing and examination.

The services provided by Color Management System 2 are preferably arranged as a web site from which the user selects choices and functions. Initially, a user accesses the web site provided by site processor 4 by entering a URL corresponding to the network address of the web site. Upon accessing the web site and providing appropriate security data (e.g., user name and password), the user is presented with options for executing many of the processes described above. The web site is preferably designed to provide users with display screens appropriate to their respective security clearance. For example, designers and color products customers will have access to a color library and design display software, and printers will have access to formula data.

Figure 7:
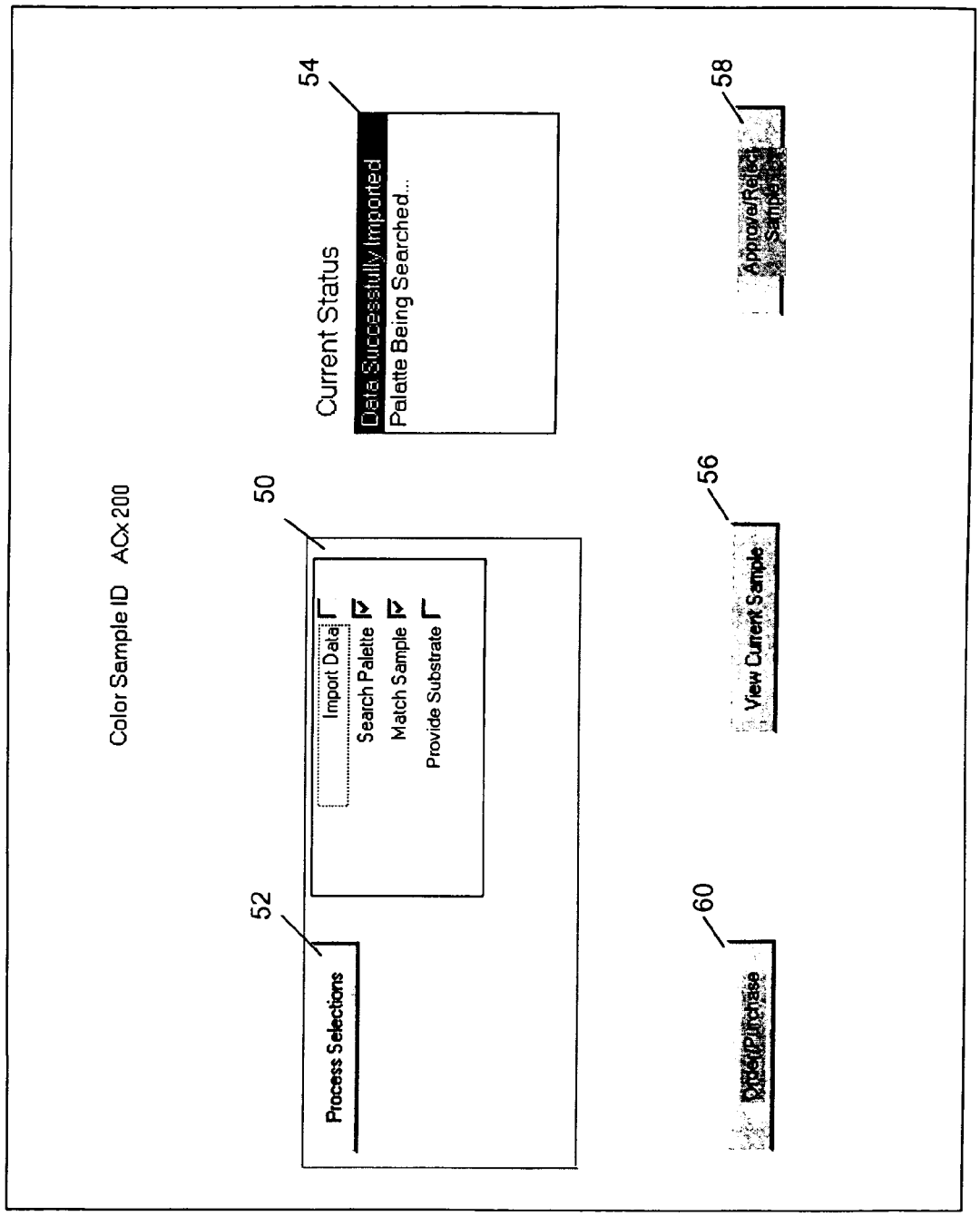
FIG. 7 illustrates an example of a display screen through which a user navigates to perform processes on color samples.

FIG. 7 shows a Sample Color Processing display screen 48 in color management 2. The display screens in Color Management System 2, substantially as shown in FIG. 7, are preferably comprised of one or more graphic control(s) including, but not limited to, title bars, labels, text input areas, check boxes, radio and push buttons. Of course, other design layouts can be fashioned using other types of graphic display controls known to those skilled in the art.

The example display screen shown in FIG. 7 enables the import of color samples, and electronically performs additional automatic processes on the samples. Color process section 50, for example, enables a user to select a series of processes, including data importing, palette searching and color matching. Once the user completes her process selections, she can invoke the selections by clicking on Process Selections button 52. When the processes are running, the Current Status text area 54 displays short messages to inform the user of the statuses of the selected processes.

Other controls are available, including the View Current Sample button 56 which enables a user to review a current work sample, the Approve/Reject button 58 enabling transmission of acceptances and rejections of samples, and the Order/Purchase button 60 enabling ordering of materials (e.g., inks) via Color Management System 2.

FIG. 8 shows an example Sample Transmission and Communication display screen 62 for enabling a user of Color Management System 2 to simultaneously transmit samples and other communications to a plurality of parties. The user preferably clicks Retrieve Previous Sample button 64 to automatically retrieve material or color samples available in site processor 4. The user also preferably views a sample by pressing View Sample button 66.

Sample Transmission and Communication display screen 62 enables a user, during various stages in the production chain, to select parties whom the user desires to receive samples. In the example shown in FIG. 8, the Smith Company, BA Company, Attentive Company, Innovative Company and Legends Company are selected by the user by placing checkmarks adjacent to their names in corresponding listboxes 72. Furthermore, Recipients list 68 displays the parties who are selected for a sample transmission. When the user is satisfied with the parties for transmission, she preferably presses Transmit Button 70 to cause an electronic transfer of data regarding a current sample. The transmitted sample is evaluated by the appropriate party, or parties, for approval during development of the color product.

The Sample Color Processing display 48 and Sample Transmission and Communication display screen 62, substantially as shown in FIGS. 7 and 8, illustrate automated uses of Color Management System 2. Users can import color samples, search palettes for color matching purposes, convert samples for different textures, and transmit samples to a plurality of parties simultaneously.

FIG. 9 shows an example search screen for enabling a user of Color Management System 2 to perform a query for matching a specific color. Included in the example screen are the aperture, the model of the color measuring device 7, a UV filter, an observer and illuminate. Further, color equations, ink ranges and printed processes are provided in order to calibrate and measure a specific color.

It is noted that while the present invention is described in terms of color-related products, the invention is not so limited. The invention can be easily modified to provide on-line, real-time transmissions for a variety of industries and applications in which there is a requirement that disparate users be able to enter and receive product data simultaneously. For example, computer software and hardware manufacturers can use the present invention to coordinate programming and production efforts during product development.

The present invention advantageously provides a comprehensive network-based facility that allows a variety of participants in the production chain to communicate color product data and production run issues with each other using a simple web browser interface. A plurality of users receive the same communications firsthand and substantially instantaneously. Additionally, a virtually unlimited number of users can log in and enter, monitor or resolve the types of color-related issues discussed herein limited only by the capacities of communication network 8 and site processor 4.

Users of the system can enter their own requests independently and data communications are triggered automatically without the need for system-provider personnel intervention. The invention therefore allows manufacturers, designers and printers to operate at peak efficiency, producing a high commercial gain, high customer satisfaction and a successful return on investment.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for using a database to develop a color product, said method comprising:
   storing development information in said database, said development information including characteristics related to development of a plurality of color products;
   receiving first color information, said first color information including at least a first color;
   identifying first development information in said database, said first development information including at least said first color;
   receiving at least one physical characteristic of said color product; and
   using said first development information to determine whether said at least one physical characteristic is compatible with said first color,
   whereby development of the color product is either:
   (a) halted if a physical characteristic is not compatible with said first color, or
   a warning is issued via a user interface if a physical characteristic is not compatible with said first color.

2. The method of claim 1, further comprising communicating said first development information between at least two color product development specialists.

3. The method of claim 2, wherein said step of communicating said first development information comprises communicating a pointer to said development information.

4. The method of claim 1, wherein said received first color information is in a first format.

5. The method of claim 1, wherein at least one of said characteristics is a color characteristic.

6. The method of claim 5, wherein said step of storing said development information further includes storing said color characteristic in a plurality of formats.

7. The method of claim 6, wherein said plurality of formats comprise at least one of visual spectral data, CIEXYZ, CIELAB, CIELUV, CIEUVW, color space, chromaticity coordinates xy, u'v' and uv, computer graphics triplets including RGB, CMYK, HLS, HIS, HSV and HVC, Munsell notation, Swedish Natural Color System notation, ColorCurve notation, RAL notation, Pantone color number, DIC color number, Color Marketing Group color name, and Color Association of the United States color name.

8. The method of claim 1, further comprising translating said first color information from a first format to a second format.

9. The method of claim 8, further comprising:
   communicating said first development information between at least two color product development specialists;
   communicating said first development information to at least one of said at least two color product development specialists in a third format in response to at least one characteristic corresponding to at least one of said at least two color product development specialists; and
   wherein said characteristic is a characteristic of a device used by at least one of said at least two color product development specialists to generate a visibly perceptible representation of said first color.

10. The method of claim 9, wherein said third format is said first format.

11. The method of claim 1, further comprising generating a visibly perceptible representation of said first color in response to said first color information.

12. The method of claim 1, wherein said characteristics include processes for incorporating a plurality of colors on said plurality of color products.

13. The method of claim 1, wherein said characteristics include at least one substrate characteristic used in said at least one color product.

14. The method of claim 1, wherein said characteristics include an ability of said color product to resist at least one of water, solvent, acid, alkali, temperature, humidity, abrasion, crocking, bending, light, and ultraviolet radiation.

15. The method of claim 14, further comprising generating a visibly perceptible representation of said first color in response to said at least one substrate characteristic.

16. The method of claim 1, further comprising printing said color product using said first color.

17. The method of claim 16, wherein said printing step comprises at least one of flexographic printing, offset printing, and gravure printing methods.

18. The method of claim 1, wherein said receiving step comprises using a color measuring device.

19. The method of claim 18, wherein said color measuring device is a spectrocolorimeter.

20. The method of claim 1, further comprising selecting said first color information from a plurality of retrievable samples located in at least one electronic color library.

21. The method of claim 20, wherein said at least one electronic color library is set forth on at least one site processor.

22. The method of claim 1, further comprising communicating said first color information using a global communication network.

23. The method of claim 22, wherein said global communication network is the Internet.

24. The method of claim 1, further comprising communicating said first color information using a direct dial-up connection.

25. The method of claim 1, further comprising providing access to said database to at least two color product development specialists.

26. The method of claim 25, wherein said at least two color product specialists include at least one of a customer, a designer, a color separator, a printer, an ink manufacturer, a customer, a formulation chemist, a color compounder, a plastics molder, a pigment manufacturer, a dye manufacturer, a dyer, a retailer, a garment designer, a textile designer, an architectural designer, an interior designer, a painting contractor, and a paint supplier.

27. The method of claim 25, wherein said database comprises data entry display screens enabling said at least two color product development specialists to enter their respective contributions to said development of said color product.

28. The method of claim 27, wherein said contributions relate to a development function performed by said at least two color product development specialists.

29. The method of claim 28, further comprising providing choices in said data entry display screens to said color product development specialists in response to said compatibility of said at least one physical characteristic with said first color.

30. The method of claim 29, further comprising revising said color product development in response to said compatibility of said at least one physical characteristic with said first color.

31. The method of claim 28, further comprising providing choices in said data entry display screens to said color product development specialists in response to said respective contributions to said development of said color product.

32. The method of claim 31, further comprising stopping said color product development in response to said respective contributions to said development of said color product.

33. The method of claim 32, further comprising revising said color product development in response to said respective contributions to said development of said color product.

34. A method of coordinating development of a color product, said method comprising:
storing development information in at least one database set forth on at least one site processor, said development information including characteristics related to development of a plurality of color products, said development information including processes for incorporating a plurality of colors on said plurality of color products;
receiving first color information from a first color product development specialist, said first color information including at least a first color;
identifying first development information in said at least one database, said first development information including at least said first color;
receiving at least one physical characteristic of said first color product;
communicating said development information using a global communication network between at least two color product development specialists; and
using said first development information to determine whether said at least one physical characteristic is compatible with said first color,
whereby development of the color product is either:
(a) halted if a physical characteristic is not compatible with said first color, or
a warning is issued via a user interface if a physical characteristic is not compatible with said first color.

35. The method of claim 34, wherein at least one of said characteristics is a color characteristic.

36. The method of claim 35, wherein said step of storing said development information further includes storing said color characteristic in a plurality of formats.

37. The method of claim 36, wherein said plurality of formats comprise at least one of visual spectral data, CIEXYZ, CIELAB, CIELUV, CIEUVW, color space, chromaticity coordinates xy, u'v' and uv, computer graphics triplets including RGB, CMYK, HLS, HIS, HSV and HVC, Munsell notation, Swedish Natural Color System notation, ColorCurve notation, PAL notation, Pantone color number, DIC color number, Color Marketing Group color name, and Color Association of the United States color name.

38. The method of claim 34, wherein said identifying step comprises translating said first color information from a first format to a second format.

39. The method of claim 38, further comprising communicating said first development information to a second color product development specialist in a third format in response to at least one characteristic corresponding to said second color product development specialist.

40. The method of claim 39, wherein said third format is said first format.

41. The method of claim 34, further comprising generating a visibly perceptible representation of said first color in response to said first color information.

42. The method of claim 34, further comprising generating a visibly perceptible representation of said first color product in response to said at least one physical characteristic.

43. The method of claim 34, further comprising providing access to said at least one database to said at least two color product developers.

44. The method of claim 43, wherein said database comprises data entry display screens enabling said at least two color product development specialists to enter respective contributions to said development of said color product.

45. The method of claim 44, further comprising providing choices in said data entry display screens to said color product development specialists in response to said compatibility of at least one physical characteristic with said first color.

46. The method of claim 44, further comprising providing choices in said data entry display screens to said color product development specialists in response to said respective contributions to said development of said color product.

47. The method of claim 34, wherein said at least two color product specialists include at least one of a customer, a designer, a color separator, a printer, an ink manufacturer, a customer, a formulation chemist, a color compounder, a plastics molder, a pigment manufacturer, a dye manufacturer, a dyer, a retailer, a garment designer, a textile designer, an architectural designer, an interior designer, a painting contractor, and a paint supplier.

48. The method of claim 34, said receiving step further comprising using a color measuring device.

49. The method of claim 48, wherein said color measuring device is a spectrocolorimeter.

50. The method of claim 34, wherein said global communication network is the Internet.

51. The method of claim 34, further comprising electronically communicating said first color information using a direct dial-up connection.

52. A system to develop a color product, said system comprising:
a database storing development information, said development information including characteristics related to development of a plurality of color products;
a first software facility receiving first color information, said first color information including at least a first color;
a second software facility identifying first development information in said database, said first development information including at least said first color;
a third software facility receiving at least one physical characteristic of said color product; and
a fourth software facility using said first development information to determine whether said at least one physical characteristic is compatible with said first color,
whereby development of the color product is either:
(a) halted if a physical characteristic is not compatible with said first color, or
a warning is issued via a user interface if a physical characteristic is not compatible with said first color.

53. The system of claim 52, further comprising a communication network wherein at least two color product development specialists communicate said first development information using said communication network.

54. The system of claim 53, wherein said communicated first development information includes a pointer to said first development information.

55. The system of claim 52, wherein said received first color information is in a first format.

56. The system of claim 52, wherein at least one of said characteristics is a color characteristic.

57. The system of claim 56, wherein said development information further includes said color characteristic stored in a plurality of formats.

58. The system of claim 57, wherein said plurality of formats comprise at least one of visual spectral data, CIEXYZ, CIELAB, CIELUV, CIEUVW, color space, chromaticity coordinates xy, u'v' and uv, computer graphics triplets including RGB, CMYK, HLS, HIS, HSV and HVC, Munsell notation, Swedish Natural Color System notation, ColorCurve notation, RAL notation, Pantone color number, DIC color number, Color Marketing Group color name, and Color Association of the United States color name.

59. The system of claim 52, wherein said first color information is translated from a first format to a second format.

60. The system of claim 59, further comprising:
a communication network wherein at least two color product development specialists communicate said first color development information using said communication network; and
said first development information being in a third format in response to at least one characteristic corresponding to at least one of said at least two color product development specialists, and wherein said characteristic is a characteristic of a device used by at least one of said at least two color product development specialists to generate a visibly perceptible representation of said first color.

61. The system of claim 60, wherein said third format is said first format.

62. The system of claim 52, further comprising a fifth software facility for generating a visibly perceptible representation of said first color in response to said first color information.

63. The system of claim 52, wherein said characteristics include at least one substrate characteristic.

64. The method of claim 63, wherein said characteristics include an ability of said color product to resist at least one of water, solvent, acid, alkali, temperature, humidity, abrasion, crocking, bending, light, and ultraviolet radiation.

65. The system of claim 64, further comprising a fifth software facility for generating a visibly perceptible representation of said first color in response to said at least one substrate characteristic.

66. The system of claim 52, further comprising a sixth software facility for printing said color product using said first color.

67. The system of claim 66, wherein said sixth software facility provides for at least one of flexographic printing, offset printing, and gravure printing methods.

68. The system of claim 52, wherein said third software facility further provides for using a color measuring device.

69. The system of claim 68, wherein said color measuring device is at least one of a spectrocolorimeter, a spectrodensitometer, a calorimeter, and a spectrophotometer.

70. The system of claim 52, wherein said second software facility further provides for selecting said first color information from a plurality of retrievable samples located in at least one electronic color library.

71. The system of claim 70, wherein said at least one electronic color library is set forth on at least one site processor.

72. The system of claim 52, further comprising a global communication network for communicating said first color information.

73. The system of claim 72, wherein said global communication network is the Internet.

74. The system of claim 52, further comprising a direct dial-up connection for communicating said first color information.

75. The system of claim 52, further comprising access to said database to at least two color product development specialists.

76. The system of claim 75, wherein said at least two color product development specialists include at least one of a customer, a designer, a color separator, a printer, and an ink manufacturer.

77. The system of claim 75, wherein said database comprises data entry display screens enabling said at least two color product development specialists to enter their respective contributions to said development of said color product.

78. The system of claim 77, wherein said data entry display screens provide choices in to said color product development specialists in response to said respective contributions to said development of said color product.

79. The system of claim 78, wherein at least one of said first, second, third and fourth software facility notifies said color product development specialists to stop development of said color product in response to said respective contributions to said development of said color product.

80. The system of claim 79, wherein said at least one of said first, second, third and fourth software facility notifies said color product development specialists to revise said development of said color product in response to said respective contributions to said development of said color product.

81. The system of claim 77, wherein said data entry display screens provide choices to said color product development specialists in response to said compatibility of at least one physical characteristic with said first color.

82. The system of claim 81, wherein said at least one of said first, second, third and fourth software facility notifies said color product development specialists to revise said development of said color product in response to said compatibility of said at least one physical characteristic with said color.

* * * * *